UNITED STATES PATENT OFFICE.

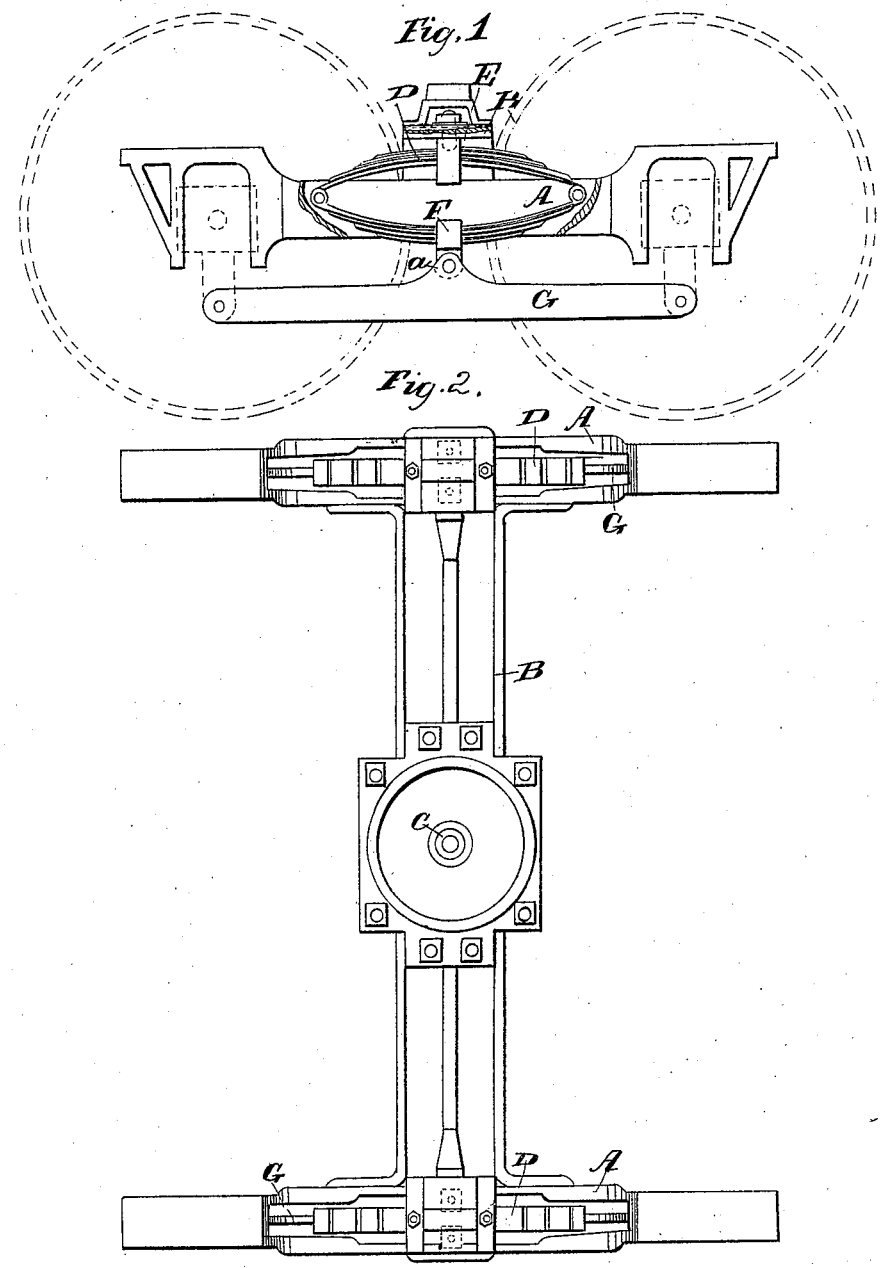

JOHN S. HOWARD, OF SCHENECTADY, NEW YORK.

IMPROVED CAR-TRUCK.

Specification forming part of Letters Patent No. 59,021, dated October 23, 1866.

*To all whom it may concern:*

Be it known that I, JOHN S. HOWARD, of Schenectady, in the county of Schenectady and State of New York, have invented a new and useful Improvement in Car-Trucks; and I do hereby declare that the following is a full, clear, and exact description thereof, which will enable others skilled in the art to make and use the same, reference being had to the accompanying drawings, forming part of this specification, in which—

Figure 1 is a side view of a car-truck, partly in section, and having my invention applied to it; Fig. 2, a plan or top view of the same.

Similar letters of reference indicate like parts.

This invention relates to a new and improved application of elliptical springs to a car-truck, as hereinafter fully shown and described, whereby the truck is allowed to rock or vibrate freely, and much wear and tear of the running-gear of the car avoided.

The invention consists in inserting an elliptical spring in each transverse beam of the truck, and having bars pivoted to pendants attached to the lower parts of the springs, the ends of the pivoted bars being attached to the axle-boxes, all arranged as hereinafter set forth.

A A represent the side or transverse beams of a car-truck; B, the central beam, and C the pivot, which is fitted in the bearing or step in the car, and from which the truck turns as a center, as usual.

In each beam A there is fitted an elliptical spring, D, the springs being firmly secured in position by clamps E at the upper parts. To the lower part of each spring D there is attached a pendant, F, to each of which a bar, G, is secured centrally by a pivot-bolt, $a$, and the outer ends of these bars G are secured by pivots to the axle-boxes, as shown in Fig. 1, the axle-boxes being shown in red.

From the above description it will be seen that the weight of the car is transmitted to the axles of the truck through the springs D and bars G, and the truck will be allowed to vibrate freely, owing to the connection of the bar G to the axle-boxes. The truck is preserved from all strain by this arrangement, and much wear and tear is avoided.

I claim as new and desire to secure by Letters Patent—

The combination of the beam A, elliptical spring D, pendant F, pivoted bar G, and the axle-boxes, and operating substantially as described, for the purpose specified.

JOHN S. HOWARD.

Witnesses:
   STEPHEN YATES,
   CYRUS THAYER.